United States Patent
Spielberg et al.

(10) Patent No.: US 9,936,269 B2
(45) Date of Patent: Apr. 3, 2018

(54) METHOD FOR COLLECTING AND TRANSMITTED DATA OF AN OBJECT IMPACTED BY ANOTHER IMPACTED OBJECT, APPARATUS, OR DEVICE

(71) Applicants: Gordon Spielberg, Palm Desert, CA (US); Jefferson Nunn, Henderson, CO (US)

(72) Inventors: Gordon Spielberg, Palm Desert, CA (US); Jefferson Nunn, Henderson, CO (US)

( * ) Notice: Subject to any disclaimer, the term of this patent is extended or adjusted under 35 U.S.C. 154(b) by 327 days.

(21) Appl. No.: 14/163,249

(22) Filed: Jan. 24, 2014

(65) Prior Publication Data

US 2016/0044389 A1 Feb. 11, 2016

Related U.S. Application Data

(60) Provisional application No. 61/756,213, filed on Jan. 24, 2013.

(51) Int. Cl.
*H04Q 9/00* (2006.01)
*H04W 4/02* (2018.01)

(52) U.S. Cl.
CPC ............... *H04Q 9/00* (2013.01); *H04W 4/02* (2013.01); *H04Q 2209/43* (2013.01)

(58) Field of Classification Search
CPC .................................. H04Q 9/00; H04W 4/02
USPC ..................................................... 340/870.09
See application file for complete search history.

(56) References Cited

U.S. PATENT DOCUMENTS

| | | | | |
|---|---|---|---|---|
| 6,148,271 A * | 11/2000 | Marinelli | ............... | A63B 43/00 473/198 |
| 9,257,054 B2 * | 2/2016 | Coza | ................ | G09B 19/0038 |
| 9,504,414 B2 * | 11/2016 | Coza | ................ | G06F 3/011 |
| 2008/0284650 A1 * | 11/2008 | MacIntosh | ......... | A63B 24/0021 342/357.57 |
| 2012/0007885 A1 * | 1/2012 | Huston | ................ | H04W 4/02 345/633 |
| 2012/0316843 A1 * | 12/2012 | Beno | ................ | G06Q 10/0639 703/2 |
| 2014/0266160 A1 * | 9/2014 | Coza | ................ | G01B 7/003 324/207.11 |
| 2014/0364101 A1 * | 12/2014 | Do | ................ | H04W 4/02 455/418 |

* cited by examiner

*Primary Examiner* — Omar Casillashernandez
(74) *Attorney, Agent, or Firm* — Schmeiser, Olsen & Watts LLP

(57) ABSTRACT

Apparatus and methods of collecting and transmitting data of an object during an activity where object is impacted by another object. A method of tracking an object's location and trajectory based on data received at a portable device used by the participant; to determine a location and trajectory based on data received at a mobile device embedded in the object. Collection of data transmitted to a server, compiled by a computer program, and sent to a participant during the activity. When used in a stand-alone mode, environmental conditions, velocity, change in velocity, heading, spin, exact location, force imparted to the device and the estimated resting point of the device is delivered to the participant or spectator. When used in tandem with another similar device, additional performance data of velocity, change in velocity, spin and maximum force that can be imparted onto another object is provided to the participant or spectator.

9 Claims, 7 Drawing Sheets is a circuit board schematic detailing one potential embodiment of the configuration of the apparatus sensor embedded in the object.

FIG. 1 is a circuit board schematic detailing one potential embodiment of the configuration of the apparatus sensor embedded in the object.
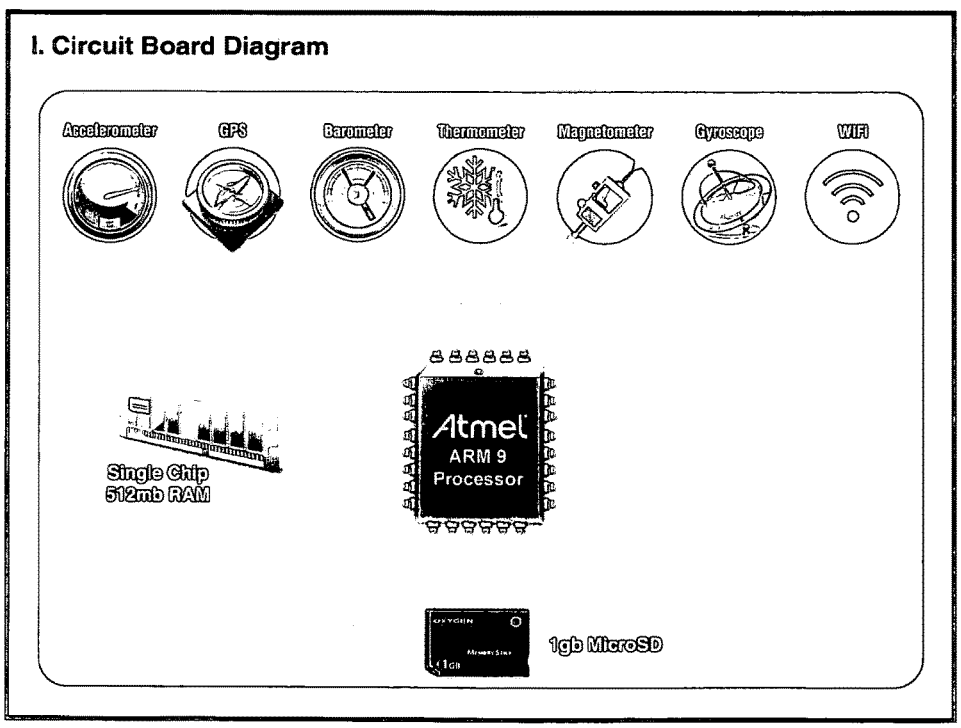

FIG. 2 is a process schematic of one embodiment of the start-up sequence of the method.
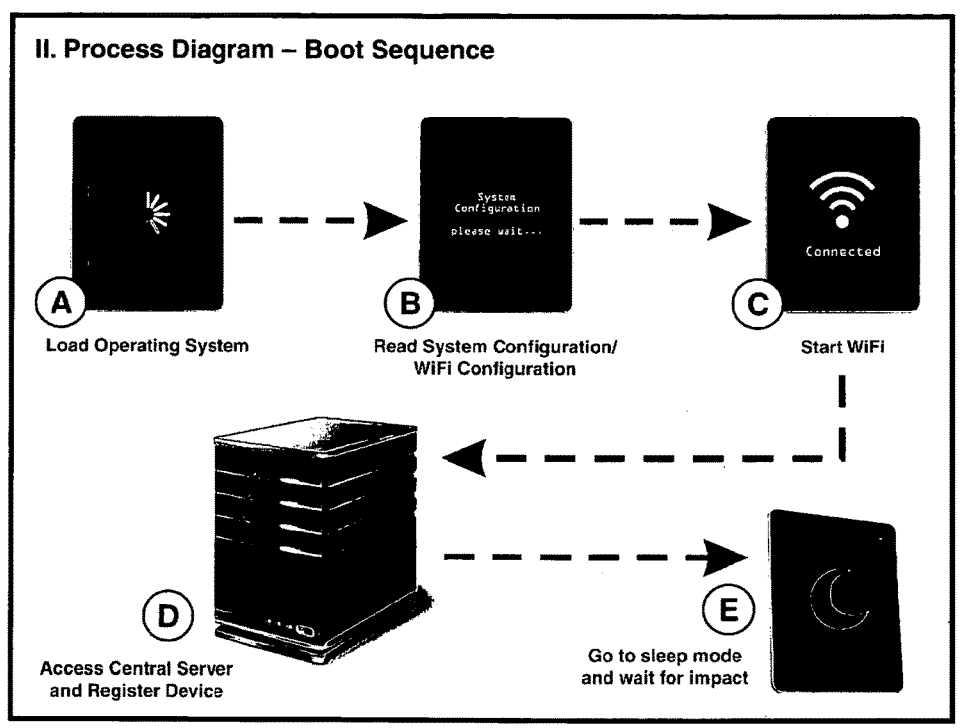

FIG. 3 is a process schematic of one embodiment detailing how the apparatus sensor will collect and transmit data upon impact by another object.
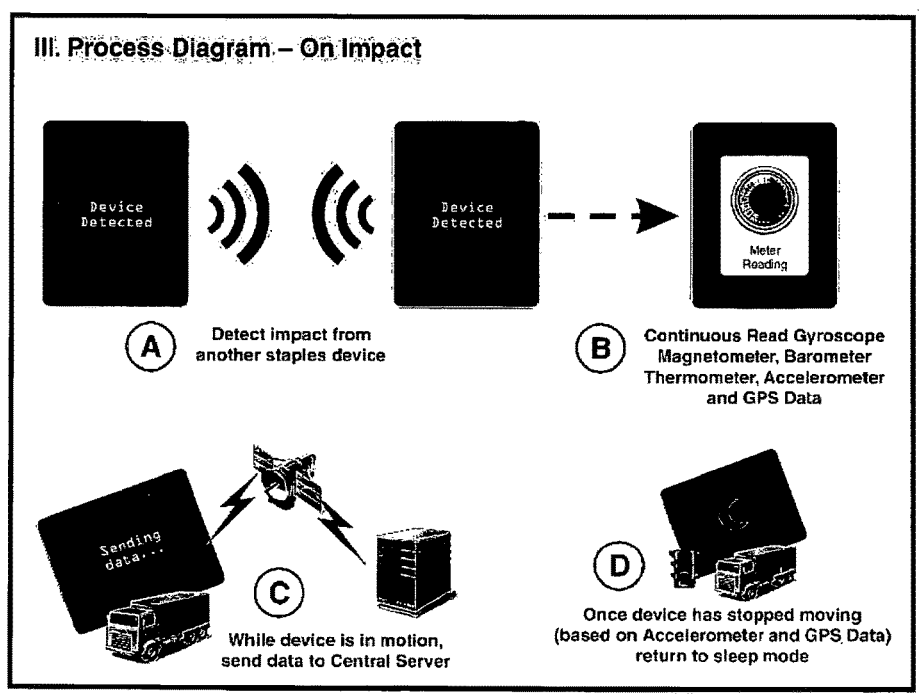

FIG. 4 is a sample mobile device application derived from the method that will display the sensor data received from the server or storage device in order to register a new device.
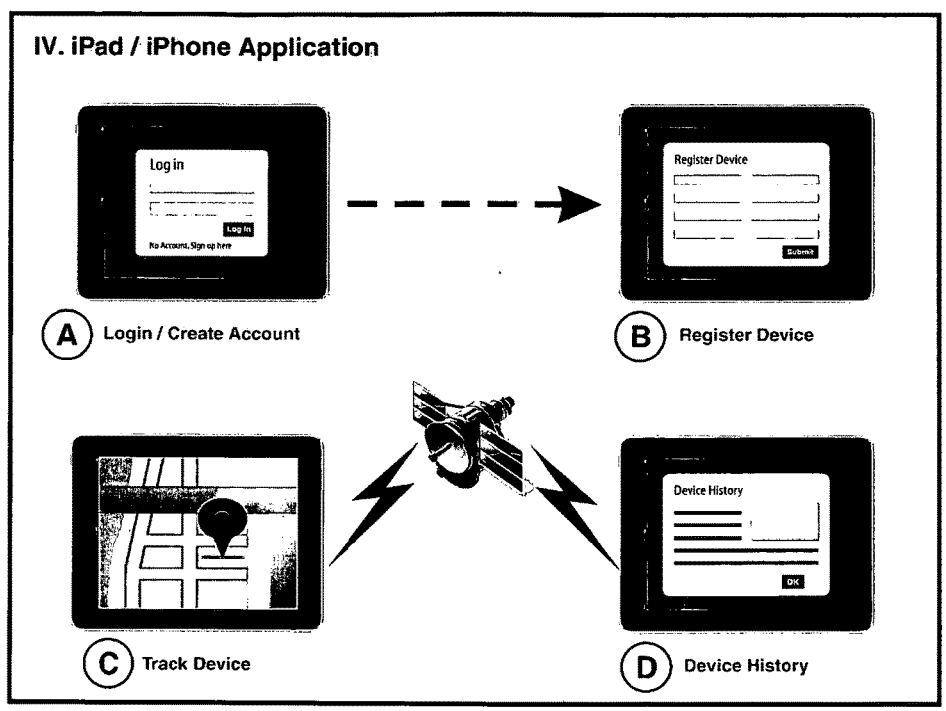

FIG. 5 is a sample mobile device application derived from the method that will display the registration protocols for the embedded sensor received from the server or storage device.
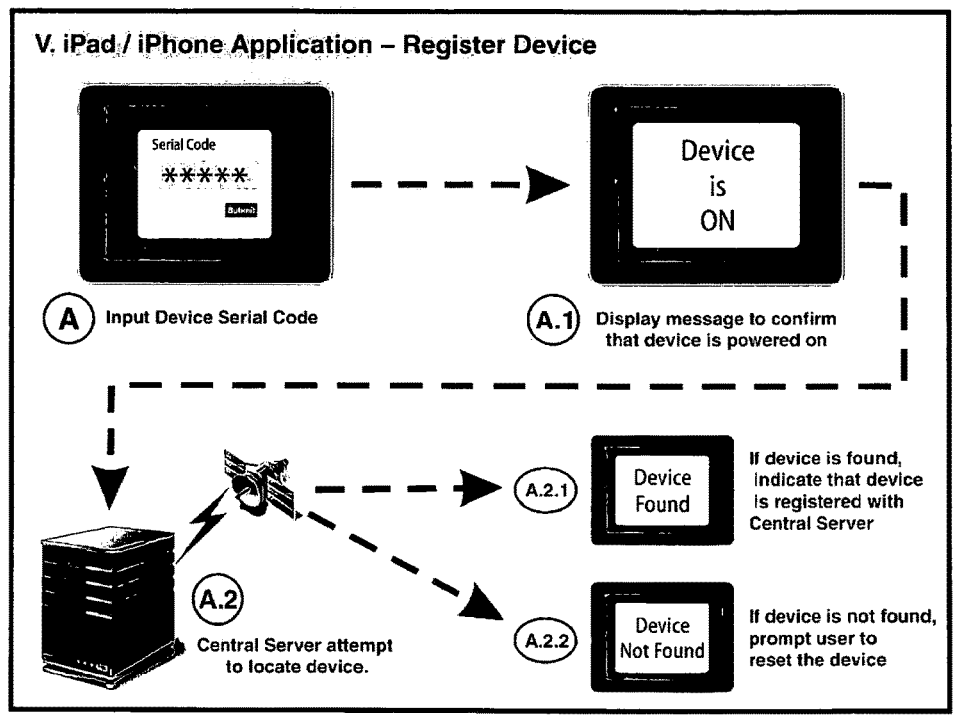

FIG. 6 is a sample mobile device application derived from the method that will display the location and tracking of the embedded sensor device or apparatus.
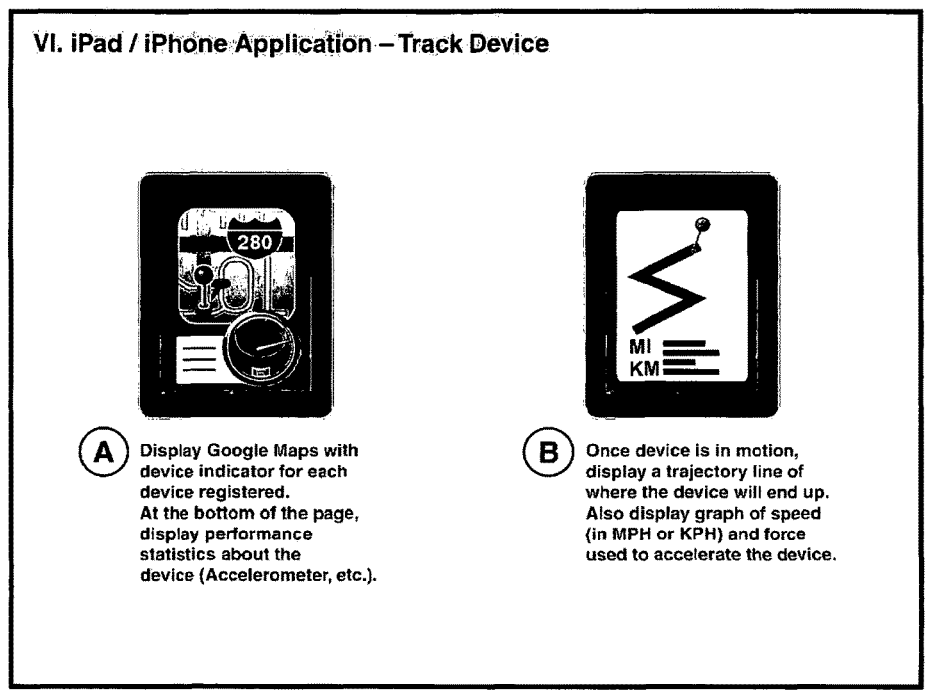

FIG. 7 is a sample mobile device application derived from the method that will display the data history of the embedded sensor data received from the server or storage device.
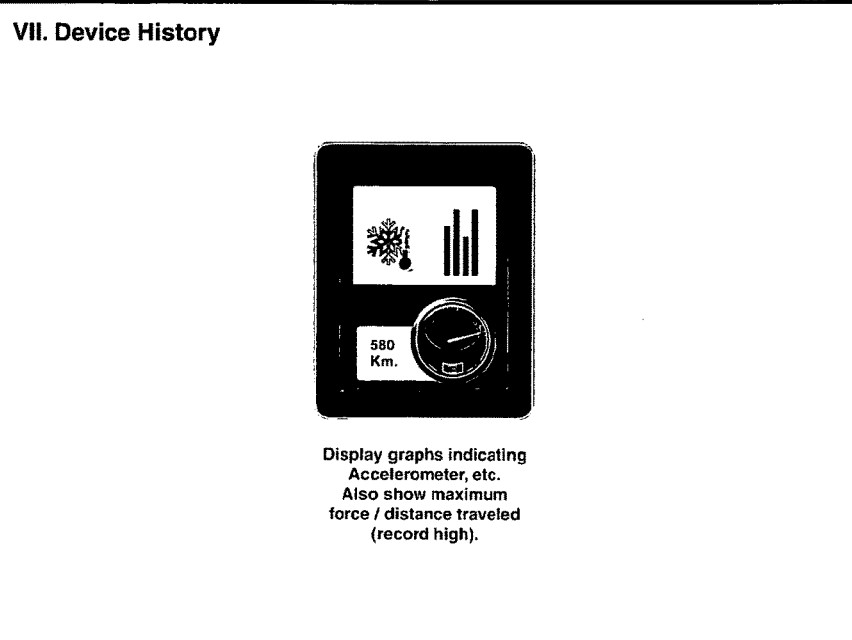

METHOD FOR COLLECTING AND TRANSMITTED DATA OF AN OBJECT IMPACTED BY ANOTHER IMPACTED OBJECT, APPARATUS, OR DEVICE

CROSS-REFERENCE TO RELATED APPLICATIONS

None

FEDERALLY SPONSORED RESEARCH

None

SEQUENCE LISTING

None

I. TECHNICAL FIELD OF INVENTION

The present invention relates generally to the data collection of an object that has been struck or impacted by another separate object and more particularly to a method for collecting the related motion, trajectory, speed, force and various other classifications of data while the object is in motion in a fast and efficient system in which a collection device and wireless transmitter is used as a platform to relay the data to a storage device. The instant invention also relates to a method associated with a portable wireless apparatus for the collecting and transmitting of related data from an object set in motion by another object. A methods for tracking the location of an object during an activity are disclosed. A method of tracking an object engaged in an activity includes determining a location of the object during the activity based on data received at a portable fitness device used by a participant or tool or object; determining a location of an object in relation to a participant or spectator during the activity based on data received at a mobile device used by a participant or spectator; or from a server, sending an alert to a participant or spectator at a device during the activity indicating the relevant data collected on motion, trajectory, speed, force and various other classifications of data; and sending an alert and data from the portable device during the activity to the participant or spectator.

II. BACKGROUND

The present invention relates to any object impacted by another object, such as a bat and a ball, a golf club and a golf ball or a bowling ball and pins without direct implication to any one activity or sport. The present invention is directed to activity monitoring and data collection. More particularly, embodiments of the present invention are directed to a system and method for monitoring the location of an object within a particular activity with participants and/or an activity spectator. A wireless apparatus is inserted in the object ball or other relevant object and said wireless apparatus shall collect and transmit data to a storage device with a computer program that will display, compile and tabulate the results. Presently, it is not possible to easily determine the exact impact data a certain participant, utilizing objects such as a bat or club, impacting a ball or another object. Once the participant impacts the object or ball with a bat or associate object, there is a great deal of force imparted onto the ball from the bat. In the current sports environment, this data is not presently collected or transmitted for data collection and analysis, nor does a method or device exist that performs said function on experimentation levels.

Sports activities and the objects used to participate in said activities can generate a wealth of information to improve the experience of both participants and spectators. In this context, spectators may include, for example, coaches, trainers, supervisors, aid station attendants, or doctors. For example, improving the communication and data collection between participants and such spectators may be useful for supervising the physical condition of the participating athletes to achieve better performance or to provide medical services in order to prevent injuries or other health threats. The data collection may also improve participant technique and performance in the desired activity. Certain technology has resulted in the development of systems capable of monitoring the objects of these activities and the performance of individuals engaged in these activities. However, the data collection, monitoring systems and methods are not current adequate and do not provide the compressive solution of the present invention that is needed to provide real-time information to participants and spectators of these activities.

There are external performance gathering tools that are used to gather some data about thrown balls or a participant's activity. For recording data about a thrown ball, a radar gun is used in baseball that measures the velocity of the ball. In this instance, the velocity is chronicled but other important and relevant data are lost or not collected. Such data includes but is not limited to g-forces, spin, altitude and direction as well as environmental conditions such as the barometer and temperature. Accordingly, this loss of data does not lead to an accurate analysis of the performance of the impacted object by a bat or similar sports utility tool.

Similarly, there are other performance gathering techniques to include a three dimensional analysis of a participant by the use of hooking up probes to the participant's body and analyzing the swing characteristics in a laboratory environment. However, this methods and devices do not provide a detailed analysis of a participants' performance in the field utilizing the actual equipment. Further, the data that could be provided relating to the qualities and attributes of the impact of the bat with the ball (or the ball with the pins) are not collected and thus lost.

U.S. Pat. No. 8,353,791 relates to a system for tracking balls in sports in which participants kick, pass, bounce, strike or carry a ball. The ball is equipped with two beacons pulsing in the 5-10 Hz range at a frequency, which is not attenuated, by the body of the participants. However, this system relies on a data logger worn by the participants, which includes a clock, location and speed sensors, a receiver for the beacon signals and a micro controller to record the data from all the sensors. A micro controller is able to record whether the participant is in possession of the ball or is contesting the ball. The path of the ball from participant to participant is tracked relative to the playing field. An impact or pressure sensor may be fitted to the participant's footwear, glove or a bat stick, club or racquet to register a kick or ball strike. This system is effective for tracking the path and trajectory of an object but it cannot provide the additional data the current invention tabulates and relays to the computer program application.

U.S. Pat. No. 7,911,324 relates to a method and arrangement for obtaining information about a radio-frequency identification (RFID) device or an object on which the RFID device is mounted when the RFID device is in a space defined by a frame includes arranging a plurality of antennas on the frame to enable transmission of signals into the space and reception of signals from the space, controlling transmission of signals by the antennas by means of an interrogator, and directing radio frequency signals from at least one of the antennas into the space to cause a RFID device in the space to return a signal if it receives any signal from any of the antennas. This method and device also lacks the additional information that will be tabulated and collect by the current invention because this prior art focuses only on the location of an RFID in relation to the collection device.

U.S. Pat. No. 7,698,101 relates to a sensor within a garment that transfers information, either wirelessly or wired, to an external data-processing device. Such information includes location, physiometric data of the individual wearing the garment, garment performance and wear data (when the garment is an athletic shoe, for example). The external data processing device can be portable digital media participants that are, in turn, in wireless communication with a server computer or other wireless devices. This device too lacks the additional data that will be collected and transmitted by the current invention.

U.S. Pat. No. 7,620,466 relates to a computerized tracking system with computer program and data collection devices used to deduce events and accumulate statistics about a sporting event. Events and statistics are accumulated based on tracking possession of the ball, or primary object of play. In addition to gathering statistics based on the possession of the ball, the system will also include a method of accumulating additional game statistics by logging specific game events. This system is a general means for data collection and does not account for the empirical data collect and transmitted by the current invention. It lacks the collection means, save only location statistics, that the current invention will provide to the user.

U.S. Pat. No. 7,607,243 relates to articles of footwear and other devices for sensing physical and/or physiological characteristics associated with use of the footwear or other devices. This device includes a housing for receiving an electronic module, mechanisms for mounting the module in the housing, and activation/authentication systems for selectively activating the module. Additionally, methods of making articles of footwear or other structures that include such housings, electronic modules, release systems, activation systems, authentication systems, etc. are described in this device. However, this performance sensing system and method are localized to the shoe of a competitor or user. The current invention involves not only the user, but also the tools or equipment and the ball or projectile of the event. Data is collected and transmitted by the current invention rather than just data collection from the shoe of a user as reflected in this system.

U.S. Pat. No. 7,404,263 also relates to an article of footwear, particularly a soccer shoe, having one or more sensors mounted in the shoe upper which, when impacted by a ball, are effective to send a signal to a controller representative of the magnitude of the force with which the ball was struck by the shoe. A liquid crystal display, mounted within a housing, which also carries the controller, provides a visual indication of the force of the ball strike, which can be readily observed by the wearer of the shoe. This invention is again localized to the shoe and transmits data to a controller, but the only data provided and collected comes from the shoe of the user rather than the comprehensive collection provided by the current invention.

U.S. Pat. No. 7,292,867 relates to a portable fitness device which includes a GPS receiver that receives GPS signals, a wireless wide-area network transmitter supporting communication over-the-air to a wireless communication network, and a processing unit coupled to the GPS receiver and the wireless wide-area network transmitter. The processing unit receives the time-stamped waypoints from the GPS receiver and determines athletic performance information and route information from the time-stamped waypoints. The processing unit further outputs at least one of the athletic performance information and the route information to the wireless communication network during a human fitness activity via the wireless wide-area network transmitter. Once again this described prior art lacks only provides one element of data, specifically GPS determined location, and does not consider or collet all the other relevant data that is collected by the current invention.

U.S. Pat. No. 7,091,863 relates to a system for tracking the movement and location of an object in a predefined area. The system comprises an object having at least one readable sensor contained therein. The at least one readable sensor transmits a unique signal. There is also at least one reader at a preselected, proximate location, wherein the at least one reader reads each unique signal from each at least one readable sensor as each sensor moves through the predefined area. There is also a control system. The control system is programmed to use the unique signal from each at least one readable sensor to precisely locate each object within the predefined area. There is also a communication link between each at least one reader and the control system. This system and devices is applicable to sporting events but yet again focuses specifically on location of a projectile and does not consider other relevant data that the current invention takes into account, collects and transmits.

U.S. Pat. No. 6,876,947 relates to a method of identifying an average foot contact time of a user during an event, identifying an average pace of the user during the event, defining a relationship between foot contact times of the user and corresponding paces of the user, wherein the relationship is based upon the average foot contact time and the average pace identified during the event, and wherein no other average foot contact times and no other average paces identified during any different outings by the user are used to define the relationship; and finally calibrating at least one device that monitors activity of the user in locomotion on foot based upon the defined relationship between foot contact times of the user and corresponding paces of the user. This method was a forerunner of the previous collection methods wherein location within an event is identified and collected. However, this method lacks the robust collection method and device the current invention offers as advancement on the basic tenant of data collection within a sporting event.

U.S. Pat. No. 6,749,432 relates to an interactive educational system which includes a tracking system for determining changes in an overall physical location of a user and a display for displaying cues for the user to engage in full-body motion and to engage in an interactive cognitive learning task. An educational method includes prompting a user to engage in an interactive cognitive learning task which involves full body motion, thereby enabling the user to reach the enhanced learning state which results from elevated metabolic rate, and synergistically engaging the user's kinesthetic learning facilities. This described system is location based, does not use GPS, and is unconcerned with other relevant data from a projectile or an object in motion during a monitored event. The current invention acts as an advancement on this described system.

As such and in conclusion, insofar as the data represents and the research concludes, there is no method for collecting data concerning the performance of a participant utilizing any method of data gathering from the actual instruments used during the play. No other system or method on the market or in the patent registry fulfills all the data collection, tabulation, and transmittal elements the present invention claims. Therefore the registration of this application is warranted and should be authorized as a novel and non-obvious advancement on the current art and technology.

III. SUMMARY

The present invention is a method for collecting and transmitted data from an object set into motion by another object. Specifically, an apparatus can be a sensor consisting of a computer processor with sensors for GPS, Accelerometer, Gyroscope, Magnetometer, Barometer and Thermometer and communication modules for computer and/or mobile networks is embedded into the objects. The objects with the apparatus embedding within may include, but are not limited to, a baseball bat, baseball, bowling ball, bowling pins, golf ball, tennis ball, etc.

Embodiments of the present invention also relate to a method of tracking an object or participant engaged in an activity. In an embodiment, the method includes: determining a location and direction of an object during an activity based on data received at a portable device used or utilized at one time or concurrently by the participant; from a server, sending and receiving motion data from a device during the activity indicating that the participant or object is within a distance or a particular location or point of interest. The method may include sending a data packet or stream from a portable sensor during the activity indicating all the relevant data points of collection relating to the object and the participant that put it into motion. The methods described herein may be implemented in any combination of hardware and/or computer program, i.e., computer programs.

A method and embodiment of the present invention may include a computer program product comprising a non-transitory computer useable medium having been written for the sensor within an object to transmit the data via wireless computer networks or mobile communication networks to a central server acting as a storage device. An embodiment of the present method also includes a second computer program written for the central server to provide access to this data for mobile devices, personal computers, or servers. The methods described herein may be implemented in any combination of hardware and/or computer program, i.e., computer programs.

In another embodiment, a computer program product comprising a non-transitory computer useable medium having computer program logic stored therein for causing one or more processors to track an object engaged or acted upon in an activity which may include: first computer readable program code for determining a location of the object and its trajectory during the activity based on data received at a portable device used by the participant or acted upon by a participant; second computer readable program code for determining a location of a participant or spectator during the activity based on data received at a mobile participant or spectator device used by the participant or spectator; and third computer readable program code for sending an alert to the portable device during the activity indicating that the object or participant or spectator is within a predetermined location of the activity and its relative position therein. The methods described herein may be implemented in any combination of hardware and/or computer program, i.e., computer programs.

In another embodiment, a user or participant swinging a baseball bat or similar object and impacting a ball with the sensor located within. At the point in time when the participant impacts the ball with the bat, the sensor collects the relevant data statistics and readings from all the applicable sensors and transmits said data to the central server via integrated wireless networking. The data can provide the structure of an analysis to determine the true performance of the participant's physical ability and output, including but not limited to, total force exerted and energy transmitted from the bat to the ball. Additionally, the method and function of the apparatus will transmit the empirical performance characteristics of the ball on its actual trajectory through its final point of rest. The methods described herein may be implemented in any combination of hardware and/or computer program, i.e., computer programs.

IV. DESCRIPTION OF DRAWING AND FIGURES

Other features, functionality, and advantages of the present method will become more apparent from the following detailed description of the method and its derivatives and certain modifications thereof when taken together with the accompanying drawings in which:

FIG. 1 is a circuit board schematic detailing one potential embodiment of the configuration of the apparatus sensor embedded in the object.

FIG. 2 is a process schematic of one embodiment of the start-up sequence of the method.

FIG. 3 is a process schematic of one embodiment detailing how the apparatus sensor will collect and transmit data upon impact by another object.

FIG. 4 is a sample mobile device application derived from the method that will display the sensor data received from the server or storage device in order to register a new device.

FIG. 5 is a sample mobile device application derived from the method that will display the registration protocols for the embedded sensor received from the server or storage device.

FIG. 6 is a sample mobile device application derived from the method that will display the location and tracking of the embedded sensor device or apparatus.

FIG. 7 is a sample mobile device application derived from the method that will display the data history of the embedded sensor data received from the server or storage device.

V. DETAILED DESCRIPTION OF DRAWINGS

The present invention will be described in detail with reference to embodiments thereof as illustrated in the accompanying drawings and figures, in which like reference numerals are used to indicate identical or functionally similar elements. References to "one embodiment", "an embodiment", "an example embodiment", etc., indicate that the embodiment described may include a particular feature, structure, or characteristic, hat every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

FIG. 1 is a circuit board schematic detailing one potential embodiment of the configuration of the apparatus sensor embedded in the object. The objects that may have an embedded circuit board can included but are not limited to, a football, basketball, baseball, softball, golf ball, bowling ball, hockey puck, tennis ball, baseball bat, golf club, bowling pin, hockey stick and tennis racket.

One embodiment of the method apparatus includes a circuit board design includes an Atmel ARM 9-based processor with 512 mb of memory and a 1 gb MicroSD card for the operating system. By using the serial bus, the Accelerometer, GPS, Barometer, Thermometer, Magnetometer, Gyroscope and WiFi modules can be attached. A Linux-based operating system is loaded onto the MicroSD card. A battery module with wireless charging is embedded onto the board.

FIG. 2 is a process schematic of one embodiment of the start-up sequence of the method. The embodiment apparatus or device is activated via a remote; (A) the device boots up and reads the configuration of the system (B). It also connects to the WiFi network (B) and communicates with the central server (C) to register itself and an accurate location and configuration details. Following, the device goes into sleep mode (D) and waits for further instructions, impact with another object or detection of a motion event (E).

FIG. 3 is a process schematic of one embodiment detailing how the apparatus sensor will collect and transmit data upon impact by another object. Once an impact event or a motion event (A) has occurred, the device wakes up (B) and begins transmitting data to the central server (C). The data transmitted include, but is not limited to: Accelerometer, GPS device location and coordinates, Barometer, Thermometer, Magnetometer, and Gyroscope. Once the event has concluded and the device is no longer in motion, the device goes into sleep mode (D).

FIG. 4 is a sample mobile device application derived from the method that will display the sensor data received from the server or storage device in order to register a new device. A new participant or spectator would login to the central server and create their account (A). The participant or spectator would then register the device serial number (B) into the system. From there, the participant or spectator would be able to track their device (C) and to view their device history (D).

FIG. 5 is a sample mobile device application derived from the method that will display the registration protocols for the embedded sensor received from the server or storage device. The participant or spectator would enter their device serial number into the central server (A). A message would indicate to the owner that the device should be activated at this time (A.1). The central server would then attempt to locate the device to read the configuration parameters and details from the device (A.2). If the device is not found, a message is displayed (A.2.1). If the device is successfully registered, a message is displayed to the participant or spectator (A.2.2).

FIG. 6 is a sample mobile device application derived from the method that will display the location and tracking of the embedded sensor device or apparatus. Once the application derived from the method accessed by a user, a Google Maps, or comparable map application, displays the device location (A). If the device is impacted or is in motion, data regarding the delta of physical attributes of the device is displayed via transmission to the server/storage device and relayed to the end user's display device (B). Consistent with the current embodiment there are two operating modes: On motion/on impact mode (no impact detected from another sensor). In this mode, only data from one device is used to track the performance of the device.

The on motion/on impact (no impact detected from another sensor) data to be displayed includes, but is not limited to:
  Environmental conditions (Barometer, Thermometer)
  Velocity (derived from Accelerometer and GPS data)
  Change in Velocity (Velocity data over time)
  Heading (derived from GPS and Magnetometer)
  Spin (derived from Gyroscope and GPS)
  Exact location (derived from GPS and WiFi)
  Force used to move the object (derived from Velocity/Spin data)
  Estimated impact location/final resting point (derived from Velocity, Heading, Spin, Environmental conditions)

The second mode is the impact detected from another sensor mode. In this mode, the initial force transmittal data is included in the display. The on motion/on impact (impact detected from another sensor) data to be displayed includes, but is not limited to:
  Environmental conditions (Barometer, Thermometer)
  Velocity (derived from Accelerometer and GPS data)
  Change in Velocity (Velocity data over time)
  Heading (derived from GPS and Magnetometer)
  Spin (derived from Gyroscope and GPS)
  Exact location (derived from GPS and WiFi)
  Force used to move the object (derived from Velocity/Spin data)
  Estimated impact location/final resting point (derived from Velocity, Heading, Spin, Environmental conditions)
  Object that instigated the cause of motion to the embedded device:
  Velocity (derived from Accelerometer and GPS data)
  Change in Velocity (Velocity data over time)
  Spin (derived from Gyroscope and GPS)
  Maximum Potential force that can be transmitted (derived from Velocity/Spin data)

FIG. 7 is a sample mobile device application derived from the method that will display the data history of the embedded sensor data received from the server or storage device. From this display screen, the end user and participant or spectator can see all the previous events captured by the embedded apparatus object. Metrics regarding the top performance data will also be included in the display as well as other relevant data, so that the participant or spectator can view the occasions wherein the maximum speed or maximum force was captured by the device. On accessing the event, a playback function is displayed wherein the participant or spectator can see the entire event replayed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

We claim:

1. A method for collecting and transmitting data of an object impacted by another impacted object or device comprising:
    collecting and transmitting the data with at least two computer program applications from an embedded apparatus, wherein the embedded apparatus is embedded on the impacted object comprises:
    a processor, a memory module, and storage unit or module, an accelerometer, a GPS with GPS antenna, a barometer, a thermometer, a magnetometer, a gyroscope, a WiFi or a Mobile Network with antenna and battery or a wireless charger;
    the collecting data further comprises obtaining performance data concerning environmental conditions, velocity, change in velocity, heading, spin, exact location, force imparted to the device and the estimated final resting point of the device of the object in which the embedded apparatus in embedded to; and
    obtaining additional performance data when used with two devices in tandem to include velocity, change in velocity, spin and maximum force that can be imparted onto another object.

2. The method of claim 1, further comprising sending an alert to a participant or spectator at the participant or spectator portable device during an activity indicating and displaying the collected and performance data of the object.

3. The method of claim 2, wherein the alert sent to the participant or spectator portable device indicates a location of the object.

4. The method of claim 1, further comprising the step of at a server, receiving object location and trajectory information.

5. The method of claim 1, wherein the data and performance data is collected in an activity; and the activity is a competitive event including a plurality of participants and objects.

6. The method of claim 2, wherein at least one of the alert sent to the participant or spectator portable device is a visual alert.

7. The method of claim 2, wherein at least one of the alert sent to the participant or spectator portable device is an audible alert.

8. The method of claim 2, wherein at least one of the alert sent to the participant or spectator portable device is a tactile alert.

9. A computer program product comprising a non-transitory computer useable medium having computer program logic stored therein for causing one or more processors to track a participant engaged in an activity, the computer program logic comprising:
    First computer readable program code for determining a location of an object during an activity based on data received at a portable fitness device used by the participant;
    Second computer readable program code for determining a location of an object during the activity based on data collected at a mobile device embedded in the object; and
    Third computer readable program code for sending an alert to the portable fitness device during the activity indicating the collected data from the mobile device within the object; and
    Wherein the collected data comprises performance data concerning the environmental conditions, velocity, change in velocity, heading, spin, exact location, force imparted to the mobile device embedded in the object and the estimated final resting point of the mobile device embedded in the object; and obtaining additional performance data when used with two mobile devices embedded in two objects, respectively, in tandem to include velocity, change in velocity, spin and maximum force that can be imparted onto one of the objects.

* * * * *